United States Patent [19]
Miyake

[11] Patent Number: 4,752,104
[45] Date of Patent: Jun. 21, 1988

[54] ANTI-LOCK SYSTEM FOR VEHICLE

[75] Inventor: Katsuya Miyake, Saitama, Japan

[73] Assignee: Akebono Brake Industry Co., Ltd., Tokyo, Japan

[21] Appl. No.: 930,005

[22] Filed: Nov. 12, 1986

[30] Foreign Application Priority Data

Nov. 19, 1985 [JP] Japan ................. 60-259234

[51] Int. Cl.$^4$ .............................. B60T 8/02
[52] U.S. Cl. ................. 303/114; 303/111; 303/119
[58] Field of Search ............... 303/111, 119, 113, 114

[56] References Cited

U.S. PATENT DOCUMENTS

| | | | |
|---|---|---|---|
| 4,578,951 | 4/1986 | Belart et al. | 303/114 |
| 4,600,244 | 7/1986 | Leiber | 303/111 |
| 4,626,043 | 12/1986 | Belart et al. | 303/119 X |
| 4,647,114 | 3/1987 | Schuett et al. | 303/92 |

FOREIGN PATENT DOCUMENTS 2148432  5/1985  United Kingdom ............. 303/114

*Primary Examiner*—Duane A. Reger
*Assistant Examiner*—Matthew C. Graham
*Attorney, Agent, or Firm*—Toren, McGeady & Associates

[57] ABSTRACT

An anti-lock system adapted for a two-channel brake system with intercrossed piping for a pair of front and rear wheel brake devices; comprising a first passage line connecting the front and rear wheel brake devices of each of the two channels to a master cylinder; a second passage line connecting a reservoir to the front and rear wheel brake devices; a normally open type first valve device disposed in the first line; a normally closed type second valve device disposed in the second line; an electronic control device which produces signals for controlling the first and second valve devices according to the presence or absence of a locking tendency of the front or rear wheel; a third passage line is arranged to connect the reservoir to the rear wheel brake device; and a third valve device is arranged in the third line to be normally in a position A in which the rear wheel brake device is allowed to communicate with the master cylinder and to be switched by a signal produced from the electronic control device over to a position B in which the rear wheel brake device is alone connected to the reservoir when the rear wheel alone tends to be locked prior to the front wheel.

3 Claims, 1 Drawing Sheet

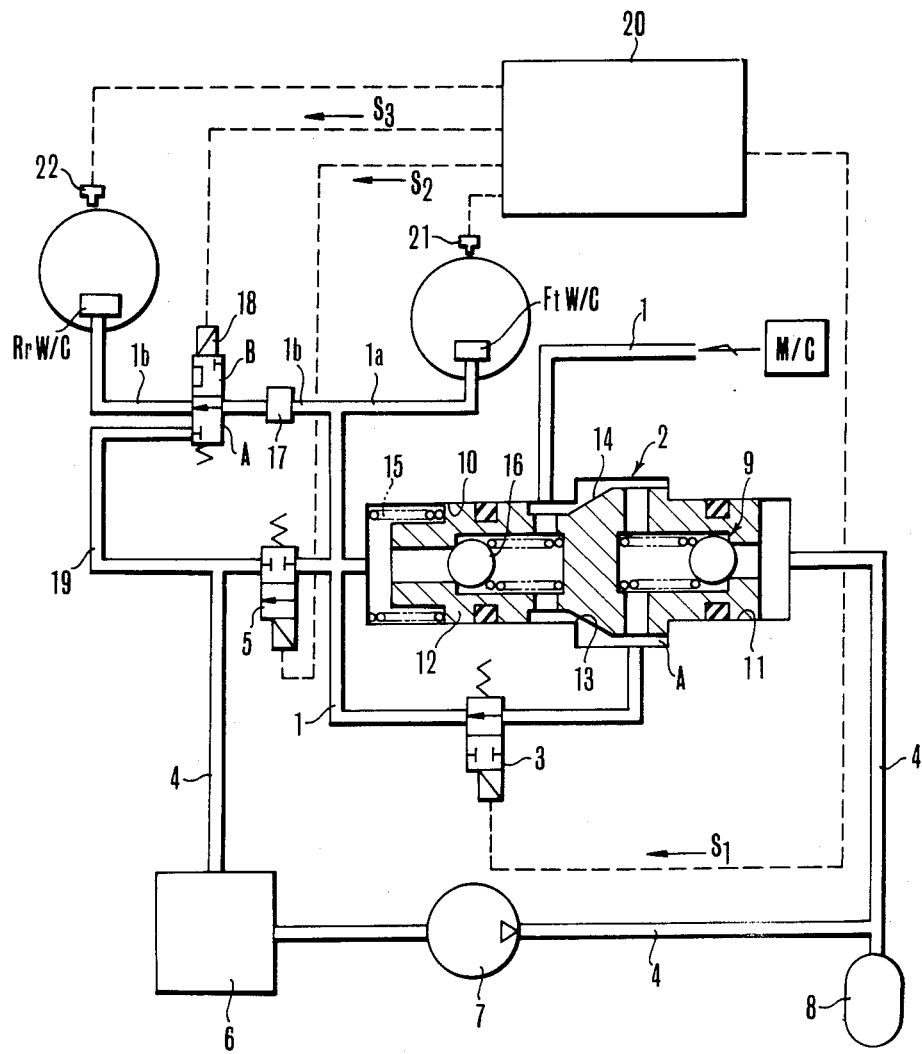

ANTI-LOCK SYSTEM FOR VEHICLE

BACKGROUND OF THE INVENTION

FIELD OF THE INVENTION

This invention relates to an anti-lock system for the wheels of a vehicle and more particularly to an anti-lock system for releasing vehicle wheels from a locked state taking place during brake application by reducing the braking hydraulic pressure.

For improved safety of brake application to vehicles, wheel anti-lock techniques of varied kinds have recently been proposed. In a typical example of these techniques, a normally open type hold valve which is normally open and closes when a braking hydraulic pressure must be lowered during anti-lock control is disposed, for example, in a braking hydraulic pressure transmission line (hereinafter referred to as the main line) which is connecting a brake device to a master cylinder (a hydraulic pressure generating device); a by-pass line is connected to the main line in a by-passing manner; the by-pass line is normally closed and is provided with pressure reducing valve which opens when the braking hydraulic pressure must be lowered; braking pressure oil inflowing via the reducing valve into the bypass line is stored within a reservoir device which is arranged, for example, to store oil while lowering hydraulic pressure therein by increasing its interior volume according as pressure is applied thereto; a pressure oil return device which includes a pump is arranged to pump up the stored oil from the inside of the reservoir to the main line; and an electronic control device which detects occurrence of a wheel lock state during brake application to the vehicle is arranged to perform opening and closing switch-over operations on the normally open type hold valve and the normally closed type pressure reducing valve.

However, the pressure oil return device being arranged to include in combination various electromagnetic (or solenoid) valves or reservoir, a pressure accumulator, a pump, etc., the conventional anti-lock control system of the kind described tends to become large in size and high in cost. There has been a great demand for some simpler anti-lock system that is more practically applicable to vehicles. To meet this demand, for example, a so-called two-channel type anti-lock system has been proposed for a vehicle having a hydraulic brake system of a cross-piping type. This system is arranged to have one anti-lock control device for each of intercrossing channels. The system, however, presents the following problem: Generally, the rear wheel brake system of a vehicle is provided with a hydraulic control device which is normally a proportioning valve which reduces or increases the braking hydraulic pressure in comparison with the front wheel side. The output of the proportioning valve (rear wheel braking pressure) has some hysteresis relative to the rise and drop of the input thereof (master cylinder pressure). Compared with a drop in the input, a drop in the output delays. In case that a locking tendency arises only at a rear wheel, the braking hydraulic pressure must be reduced to a sufficiently great degree by the anti-lock control device to remove this tendency. Then, this results in an unnecessarily great degree of reduction in braking hydraulic pressure on the front wheel.

SUMMARY OF THE INVENTION

This invention is directed to the solution of the above-stated problem of the two-channel type anti-lock system of the prior art. It is therefore an object of this invention to provide a two-channel type anti-lock system which is arranged to prevent the front wheel braking hydraulic pressure from being reduced in cases where the rear wheel alone comes to fall into a locked state prior to the front wheel.

BRIEF EXPLANATION OF THE DRAWING

The accompanying drawing is a diagram showing in outline the arrangement of an example of an anti-lock system embodying this invention.

DETAILED DESCRIPTION OF THE INVENTION

The present invention will be described in more detail referring to the accompanying drawing. The drawing shows only one of the two channels of a cross-piping type brake system embodying this invention. A main line 1 is arranged to transmit braking hydraulic pressure from a master cylinder M/C to a brake device. A normally open type gate valve 2 and a normally open type hold valve 3 (a solenoid valve=first valve device) are inserted in the main line 1. On the downstream side of the hold valve 3, the main line forks into a first line 1a and a second line 1b. The first line 1a leads to the wheel cylinder FtW/C of a right front wheel brake device. The second line 1b leads to the wheel cylinder RrW/C of a left rear wheel brake device. In the second line 1b are inserted a known proportioning valve 17 and a second pressure reducing valve (solenoid valve) 18 (third valve device) which will be described later herein. An input system is formed on the upstream side of the gate valve 2 (on the side of the master cylinder M/C). An intermediate oil chamber A is formed in between the output oil chamber of the gate valve 2 and the hold valve 3. An output system is formed on the downstream side of the hold valve 3 (on the side of the brake device).

A first by-pass line 4 is connected to the main line 1 at a point in between the output system and the intermediate oil chamber A. In the case of this specific embodiment, in the intermediate part of this by-pass line 4 are inserted: a first pressure reducing valve 5 (second valve device) which is of the normally closed type facing the output system of the main line; a reservoir 6, a pump 7, an accumulator 8 and a return valve 9 one after another. When pressure oil flows into the reservoir 6 with the first reducing valve 5 opened, the pressure oil is pumped up into the accumulator 8 by means of the pump 7 to return it to the intermediate oil chamber A via the return valve 9.

Meanwhile, an electronic control device which is included in the embodiment is arranged to produce various control signals $S_1$, $S_2$ and $S_3$ in response to signals received from front and rear wheel speed sensors 21 and 22.

In the arrangement described, the hold valve 3 and the first pressure reducing valve 5 are electromagnetic operating valves. The hold valve 3 is arranged to be closed by the signal $S_1$ which is produced from the electronic anti-lock control device instructing to stop braking hydraulic pressure from increasing or to maintain the braking hydraulic pressure. The first pressure reducing valve 5 is arranged to be opened by the signal $S_2$ instructing for reduction in the braking hydraulic pressure.

The reservoir 6 and the pump 7 may be arranged in a known manner. For example, the pump 7 may be any known pump as long as it is arranged to pump up the pressure oil the instant the first reducing valve 5 is closed. More specifically, the pump may be arranged to pump up the pressure oil in one direction through the reciprocating motion of a plunger obtained by turning an eccentric cam with a motor which is not shown.

The gate valve 2 is arranged as follows: A cylinder body which is not shown includes a pair of cylinders 10 and 11 which are coaxially formed to have the same diameter. A balance piston 12 is arranged to have the two ends thereof slidably engaged with these cylinders 10 and 11. In the intermediate stem part of the balance piston 12 is formed a valve body part 14 which is arranged to engage the valve seat part 13 of the cylinder body and to serve as a shut-off valve. The communication between the input system of the main line and the intermediate oil chamber A is thus arranged to be blocked by this shut-off valve. Further, the balance piston is arranged to have the hydraulic pressure $F_2$ of the pressure oil of the main line output system acting on the left end thereof and to have the hydraulic pressure $F_1$ of the pressure oil which is pumped up into the accumulator 8 acting on the right end thereof as shown in the drawing. Further, the gate valve 2 has the sealing sectional area of the valve seat part 13 formed to be substantially equal to the diameter of the cylinders 10 and 11.

A set spring 15 is arranged to stably keep the balance piston in its normally open state. A relief valve 16 is arranged to reliably return the pressure oil of the main line output system back to the main line input system when the vehicle is released from the brake. The second pressure reducing valve 18 is a three-way valve which is arranged normally to keep the second line 1b in a communicating state and, at the time of changeover of its position, to shut off the second line and acts to connect the wheel cylinder RrW/C of the rear wheel brake device to the reservoir 6. A second by-pass line 19 is provided for this purpose.

The hold valve 3, the first pressure reducing valve 5 and the second pressure reducing valve 18 of the anti-lock system arranged as described above operate under the control of the anti-lock control signals $S_1$, $S_2$ and $S_3$ produced from the electronic control device 20 as follows: Each of these signals $S_1$, $S_2$ and $S_3$ is produced depending on the rotating velocity of the front and rear wheels during brake application for the purpose of removing any wheel locking tendency. The signal $S_3$ is produced when the rear wheel is alone tending to be locked. The signals $S_1$ and $S_2$ are produced when either the front wheel alone is tending or both the front and rear wheels are tending to be locked. The signal producing decision and timing thereof, etc. can be made according to the technique of a known anti-lock control circuit. Further, the operating states of these three valves 3, 5 and 18 in relation to the braking pressure are as shown in the following table:

| Braking Pressure | Hold Valve 3 | 1st Reducing Valve 5 | 2nd Reducing Valve 18 |
|---|---|---|---|
| When the rear wheel is solely locked: | | | |
| Reduced | Open | Closed | In position B |
| Increased | Open | Closed | In position A |
| When the rear wheel is alone or both the front and rear wheels are locked: | | | |
| Reduced | Closed | Open | In position A |
| Maintained | Closed | Closed | In position A |
| Increased | Open | Closed | In position A |
| When the anti-lock system is inoperative: | | | |
| | Open | Closed | In position A |

With these valves arranged as shown in the above table, when the rear wheel alone must have the braking force reduced as it is solely tending to be locked prior to the front wheel, the second pressure reducing valve 18 operates on the downstream side of the proportioning valve 17, so that reduction can be effected in the braking hydraulic pressure on the rear wheel. In accordance with this invention, unlike in the case of the conventional arrangement in which both the front and rear wheels have the braking hydraulic pressure reduced under such a condition, the braking hydraulic pressure on the front wheel is not reduced. Therefore, the braking distance can be prevented from becoming longer. It is another advantage of this embodiment that the fluctuations of the braking hydraulic pressure resulting from an anti-lock control operation are not transmitted to the master cylinder, because the gate valve 2 is closed when the pressure of the main line output system is reduced.

The two-channel type anti-lock system according to this invention, as described in the foregoing, is capable of preventing unnecessary reduction in the front wheel braking hydraulic pressure in cases where the rear wheel alone comes to tend to be locked.

What is claimed is:

1. An anti-locking system for controlling a braking pressure of brake devices of front and rear wheels respectively by a common control valve device, comprising:
    a first passage line for mutually connecting said front and rear wheel brake devices;
    a second passage line for connecting an intermediate part of said first passage line and a reservoir;
    a first pressure reducing valve provided on said second passage line for simultaneously reducing a pressure of said front and rear wheel brake devices;
    a second pressure reducing valve provided on said first passage line between a junction of said first and second passage lines and said rear wheel brake device for reducing the pressure of only said rear wheel brake device;
    a third passage line for connecting said second pressure reducing valve and said reservoir without going through said first reducing valve; and
    an electronic control device for placing said first pressure reducing valve in a closed state and at the same time blocking a communication between said front and rear wheel brake devices when said rear wheel is at a locking tendency prior to said front wheel, and for so controlling said second pressure reducing valve as connecting only said rear wheel brake device to said reservoir through said third passage line.

2. A system according to claim 1, wherein said second pressure reducing valve is a three way valve having a position for mutually connecting said front and rear wheel brake devices and a position for connecting only said rear wheel brake device to the reservoir.

3. A system according to claim 2, wherein a proportioning valve is provided between said intermediate part of the first passage line and said rear wheel brake device for reducing a rate of pressure increase in said rear wheel brake device relative to that of said front wheel brake device.

* * * * *